US005953928A

United States Patent [19]

Saia, III et al.

[11] Patent Number: 5,953,928

[45] Date of Patent: *Sep. 21, 1999

[54] PORTABLE SELF-CONTAINED COOLER/ FREEZER APPARATUS FOR USE ON AIRPLANES, COMMON CARRIER TYPE UNREFRIGERATED TRUCK LINES, AND VESSELS

[76] Inventors: Louis P. Saia, III; Cynthia W. Saia, both of 106 Jim Bowie Rd., Suite A, Houma, La. 70363

[ * ] Notice: This patent is subject to a terminal disclaimer.

[21] Appl. No.: 08/854,962

[22] Filed: May 13, 1997

[51] Int. Cl.[6] .......... B60H 1/32

[52] U.S. Cl. .......... 62/239; 62/384

[58] Field of Search .......... 62/239, 384; 294/67.41, 294/74

[56] References Cited

U.S. PATENT DOCUMENTS

| | | | |
|---|---|---|---|
| 909,222 | 1/1909 | Reynolds | 294/67.41 |
| 2,235,719 | 3/1941 | Matarese | 294/67.41 |
| 3,385,073 | 5/1968 | Snelling | 62/45.1 |
| 3,519,302 | 7/1970 | Orenstein | 294/67.41 |
| 4,066,287 | 1/1978 | Rowley | 294/67.41 |
| 4,467,612 | 8/1984 | Wensel, Jr. | 62/78 |
| 4,825,666 | 5/1989 | Saia, III | 62/384 |
| 5,337,579 | 8/1994 | Saia, III et al. | 62/384 |

*Primary Examiner*—Ronald Capossela
*Attorney, Agent, or Firm*—Garvey, Smith, Nehrbass, & Doody, L.L.C.

[57] ABSTRACT

A transportable container for carrying refrigerated products in frozen (sub zero Fahrenheit (below −18° C.) or refrigerated (for example, 40° F. (4° C.) temperatures includes a structural container having an insulated outer shell with an access doorway. The upper portion of the container includes a tray or drawer in which are disposed a pair of spaced apart canisters containing liquid refrigerant ($CO_2$, for example). A gas or liquid feeder tube penetrates each bottle and communicates with an on/off valve. A feeder tube can draw liquid to dispense for cooling, or it can release gas and pressure within the canister to boil the $CO_2$. When $CO_2$ reaches its boiling point, the canister, its bracket, and the cold plate reach very cold temperatures to cool the cargo area through conduction. The gas is released through an injection nozzle into the cargo holding area. A temperature regulator valve dispenses $CO_2$ from the canisters through a header in order to maintain a desired temperature over a wide span of temperatures including, for example sub zero temperatures (−40° F. (−40° C.), for example) up to room temperature. Preferably, the container has a base plate having at least two spaced apart, parallel slots adapted to be engaged by a forklift lifting device. In addition or in the alternative, the container can advantageously have a strap lifting system which allows it to be easily lifted by a crane.

23 Claims, 3 Drawing Sheets

PORTABLE SELF-CONTAINED COOLER/FREEZER APPARATUS FOR USE ON AIRPLANES, COMMON CARRIER TYPE UNREFRIGERATED TRUCK LINES, AND VESSELS

CROSS-REFERENCE TO RELATED APPLICATIONS

Co-pending U.S. patent application Ser. No. 08/718,577, filed Apr. 3, 1995, is a continuation-in-part of U.S. patent application Ser. No. 08/222,425, filed Apr. 1, 1994, now U.S. Pat. No. 5,473,908, which is a continuation-in-part of U.S. patent application Ser. No. 07/905,791, filed Jun. 29, 1992, now U.S. Pat. No. 5,337,579, which is a continuation-in-part of U.S. patent application Ser. No. 07/602,856, filed Oct. 23, 1990, now U.S. Pat. No. 5,125,237, which is a continuation-in-part of U.S. patent application Ser. No. 07/493,298, filed Mar. 14, 1990, now U.S. Pat. No. 4,991,402, which is a continuation of Ser. No. 343,025, filed Apr. 24, 1989 (now abandoned) which is a continuation of Ser. No. 119,702, filed Nov. 12, 1987, now U.S. Pat. No. 4,825,666, all incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to portable controlled-temperature (such as frozen and/or refrigerated) containers having self-contained cooling systems.

2. General Background

Many truck lines use refrigerated trucks to carry food products over long distances. The present invention is an economical substitute for refrigerated trucks when less than a full truckload of refrigerated or frozen cargo is to be transported.

In the offshore oil and gas well drilling industry there is often a need to transport refrigerated products to deep water platforms that may be 50 to 100 miles offshore. This is a long distance for transportation of refrigerated items that necessarily requires a boat trip of many hours. As the present invention can be used for substituting for refrigerated trucks, the present invention also can be placed on marine vessels, work boats, and the like that do not have refrigeration for transporting refrigerated and/or frozen products many miles offshore to oil and gas well drilling platforms and production platforms.

For more background on this invention, see prior U.S. Pat. Nos. 5,125,237 and 5,473,908, incorporated herein by reference.

BRIEF SUMMARY OF THE INVENTION

The present invention provides an improved apparatus for shipping controlled temperature cargo in an unrefrigerated cargo area of a substantially larger transport vehicle, marine vessel, or aircraft.

The apparatus of the present invention includes a container having an interior area with a volume to be loaded with frozen and/or refrigerated and/or other controlled temperature cargo with an access opening door that can be opened and closed.

At least one refrigerant tank is mounted in the container for containing a cryogenic liquified refrigerant under pressure to be utilized for cooling the container interior. Discharge piping pipes the refrigerant from the tanks to the interior of the container. A valve communicates with the discharge piping for valving the flow of refrigerant that is discharged from the tank.

A temperature responsive controller opens the valve to dispense liquified refrigerant from the tanks in order to maintain a desired preselected preset refrigerated or frozen temperature range within the container interior.

A lifting harness is attached to the container for allowing the container to be picked up by a crane by attaching the crane to the lifting harness. The container includes a top, thin side walls that can be easily damaged, and a structural bottom or undercarriage. A plurality of horizontal beams are joined end-to-end and positioned at the top of each side wall. These horizontal beams define a top frame that reinforces the intersection between the side walls and top wall of the container, all of which are relatively thin and subject to damage.

A plurality of vertical corner beams extend from the structural base or undercarriage along the corner of the container to the top frame and its horizonal beams.

Each vertical corner beam defines a tensile load carrying member for transferring load between the top frame and the structural base or undercarriage.

The lifting harness includes lifting eyes attached to the top of the container at a connected interface between the vertical corner beams and the top frame. This is preferably in the form of a plate that is welded along a vertical line to the vertical corner beam and along a horizonal line to the top frame.

The present invention includes apparatus for shipping controlled-temperature cargo in an unrefrigerated cargo area of a substantially larger transport vehicle, vessel, or aircraft, comprising:

a) a container having an interior area with a volume to be loaded with frozen and/or refrigerated and/or other controlled-temperature cargo with an access opening that can be opened and closed;

b) at least one refrigerant tank mounted in the container for containing a cryogenic liquified refrigerant under pressure to be utilized for cooling the container interior;

c) discharge piping for piping refrigerant from the tanks;

d) a valve communicating with the discharge piping for valving the flow of refrigerant that is discharged from the tank;

e) a temperature responsive controller for opening the valve to dispense liquified refrigerant from the tanks in order to maintain a desired preselected preset refrigerated or frozen temperature range within the container interior;

f) lifting means attached to the container for allowing the container to be picked up by a crane by attaching the crane means to the lifting means;

g) wherein the container includes a top, thin side walls that can be easily damaged, and a structural bottom;

h) a top frame that includes a plurality of horizontal beams joined end to end positioned at the top of each side wall and a plurality of vertical corner beams extending from the structural base to the horizontal beams, each vertical corner beam defining a tensile load carrying member for transferring load from the horizontal top beams to the structural base; and i) the lifting means including lifting eyes attached to the top of the container at a connected interface between the vertical corner beams and the horizontal top beams, and strap means attached to the lifting eyes.

Preferably, the lifting means is attached to the padeyes in such a manner as to balance the container when a crane is attached at a single point to the lifting means. Preferably, the structural bottom includes moving means for transporting the container quickly to and from the cargo area of an unrefrigerated vehicle, vessel, or aircraft having a substantially larger volume than the container volume.

The structural bottom can advantageously include a base plate having two spaced apart, parallel slots adapted to be engaged by a forklift lifting device.

Preferably, each of the lifting eyes are welded to the top of a vertical beam and to an intersection of two horizontal beams or to the area next to an intersection of two horizontal beams, or both.

The horizontal beams preferably include end portions joined to other horizontal beams at a corner that is also a joint between two side walls.

The lifting means preferably includes a lifting shackle attached to the lifting means to enable the container to be lifted by a crane, and a strap means long enough to enable the main lifting shackle to hang over the side of the container when the container is not being lifted by the main lifting shackle.

The present invention also includes apparatus for shipping controlled-temperature cargo in an unrefrigerated cargo area of a substantially larger transport vehicle, vessel, or aircraft, comprising:

a) a container having an interior area with a volume to be loaded with frozen and/or refrigerated and/or other controlled-temperature cargo with an access opening that can be opened and closed, wherein the container includes a top, side walls, and a structural bottom;

b) at least one refrigerant tank mounted in the container for containing a cryogenic liquified refrigerant under pressure to be utilized for cooling the container interior;

c) discharge piping for piping refrigerant from the tanks;

d) a valve communicating with the discharge piping for valving the flow of refrigerant that is discharged from the tank;

e) a temperature responsive controller for opening the valve to dispense liquified refrigerant from the tanks in order to maintain a desired preselected preset refrigerated or frozen temperature range within the container interior;

f) a lifting system attached to the container for allowing the container to be picked up by a crane by attaching the crane to the lifting system;

g) the lifting system including (i) a plurality of lifting eyes attached to the top of the container;

(ii) straps attached to the lifting eyes and extending above the top of the container when the container is upright; and (iii) a frame for both transferring load between the lifting eyes and structural bottom, and protecting the side walls against damage at the joint between adjacent side walls. The lifting system is preferably attached to the container in such a manner as to balance the container when the crane is attached at a single point to the lifting system.

The structural bottom preferably includes forklift recesses for transporting the container quickly to and from the cargo area of an unrefrigerated vehicle, vessel, or aircraft having a substantially larger volume than the container volume; for example, the container bottom can have two spaced apart, parallel slots adapted to be engaged by a forklift lifting device.

The straps are preferably joined together at a point above the top of the container to enable the container to be picked up by a crane attached to the lifting system at the point. Each of the lifting eyes preferably comprises a vertical plate that extends above and below the interface between a vertical beam and a horizontal beam. The plate can be continuously attached along one of its edges to the combination of a horizontal beam and a vertical beam.

The present invention also includes a method of shipping refrigerated or frozen perishable goods in an unrefrigerated area of a vessel having a cargo holding area, comprising the steps of:

a) placing the perishable goods into a structural container that can be placed in the cargo holding area of the vessel, the container having a structural undercarriage, side walls that intersect at container corners, a top portion, and lifting eyes positioned at each corner near the top portion;

b) cooling the perishable goods by dispensing a liquid refrigerant from one or more liquid refrigerant containing canisters that are transported within the container;

c) using a valve to dispense liquid refrigerant coolant from the canisters;

d) controlling temperature within the container interior area by a control of the degree of opening of the valve; and e) transferring the container to and from the vessel with a crane means by attaching a crane to a lifting harness which is permanently attached to the container; and f) wherein in step "e" the vertical beams both protect the corners and transfer load between the undercarriage and lifting eyes.

The lifting harness is preferably attached to the container in such a manner as to balance the container when the crane is attached at a single point to the lifting harness. The method can further comprise the step of moving the container around the vessel with a forklift that engages the undercarriage at slots of the undercarriage.

The lifting harness can include a top beam portion, lifting eyes attached to the top beam portion of the container, and flexible straps attached to the lifting eyes and extending above the top of the container when the container is upright.

The lifting harness preferably further comprises a main lifting shackle attached to the flexible straps to enable the container to be lifted by a crane, and wherein the straps are long enough to enable the main lifting shackle to hang over the side of the container when the container is not being lifted by the main lifting shackle.

The present invention also includes apparatus for shipping controlled-temperature cargo in an unrefrigerated cargo area of a substantially larger transport vehicle, vessel, or aircraft, comprising:

a) a container having an interior area with a volume to be loaded with frozen and/or refrigerated and/or other controlled-temperature cargo with an access opening that can be opened and closed, a plurality of side walls connected at corners;

b) at least one refrigerant tank mounted in the container for containing a cryogenic liquified refrigerant under pressure to be utilized for cooling the container interior;

c) discharge piping means for piping refrigerant from the tanks;

d) valve means communicating with the discharge piping for valving the flow of refrigerant that is discharged from the tank;

e) temperature responsive controller means for opening the valve means to dispense liquified refrigerant from the tanks in order to maintain a desired preselected preset refrigerated or frozen temperature range within the container interior;

f) a lifting harness attached to the container for allowing the container to be picked up by a crane means by attaching the crane means to the lifting harness, wherein the container has a structural base plate having two spaced apart, parallel slots adapted to be engaged by a forklift lifting device;

g) a reinforced top beam that extends around the perimeter of the container at the top of the container;

h) a plurality of lifting eyes positioned near the top beam portion;

i) a plurality of vertical corner beams that both reinforce the corners and transfer load between the top beam portion and the structural base; and j) wherein the lifting eyes include plate members connected to both the top beam portion and a vertical beam at a corner.

The present invention can also include apparatus for shipping controlled-temperature cargo in an unrefrigerated cargo area of a substantially larger transport vehicle, vessel, or aircraft, comprising:

a) a container having an interior area with a volume to be loaded with frozen and/or refrigerated and/or other controlled-temperature cargo with an access opening that can be opened and closed a plurality of side walls joined at corners and a top beam portion that extends along an upper edge of each side wall, the frame including a plurality of lifting eyes;

b) at least one refrigerant tank mounted in the container for containing a cryogenic liquified refrigerant under pressure to be utilized for cooling the container interior;

c) discharge piping for piping refrigerant from the tanks;

d) a valve communicating with the discharge piping for valving the flow of refrigerant that is discharged from the tank;

e) a temperature responsive controller for opening the valve to dispense liquified refrigerant from the tanks in order to maintain a desired preselected preset refrigerated or frozen temperature range within the container interior;

f) a lifting system attached to the container for allowing the container to be picked up by a crane by attaching the crane to the lifting system;

g) an undercarriage portion at the lower end of the container that includes forklift recesses for transporting the container quickly to and from the cargo area of an unrefrigerated vehicle, vessel, or aircraft having a substantially larger volume than the container volume; and h) vertical beams for transferring load between the top frame and the undercarriage portion.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 3:
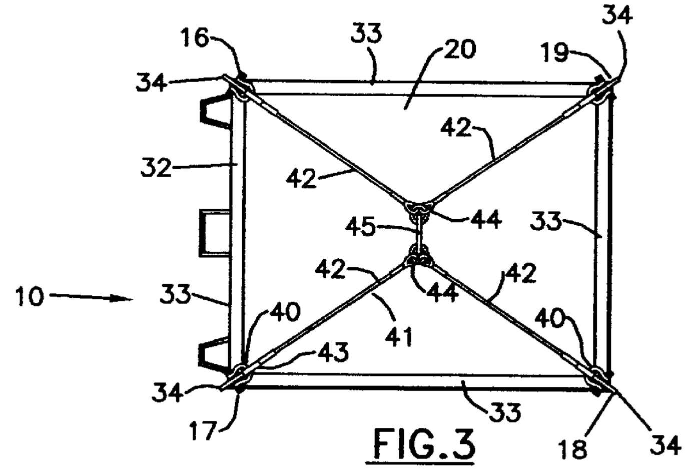
FIG. 3 is a top view of the preferred embodiment of the apparatus of the present invention.

FIGS. 1–5 show generally the preferred embodiment of the apparatus of the present invention designated by the numeral 10. Portable self-contained cooler/freezer apparatus 10 includes a structural base or undercarriage 11 that can be lifted using a forklift or like lifting mechanism. The undercarriage is constructed of structural welded steel construction for example and can withstand the stress applied thereto with a forklifting device during transportation of the apparatus 10 of the present invention in between a loading dock, a marine vessel, airplane, or the like. However, the refrigerated container 10 has side walls 13–15 that are relatively thin and can be easily damaged. This includes the front wall 12, a pair of right and left respective side walls 13, 14, and rear wall 15. Likewise, top wall 20 is a relatively thin wall that can be easily damaged.

The container 10 has corners 16, 17, 18, 19 that define the intersections between adjacent side walls 12, 13, 14, 15.

In order the move the container 10 from one location to another using a forklift, a plurality of forklift sockets 21, 22, 23, 24 are provided. The sockets 21, 22 are preferably parallel. Likewise, the sockets 23, 24 are also preferably parallel. It should be understood that the sockets 21, 22 can extend completely through the undercarriage 11 so that the apparatus 10 can be lifted from the front or rear using a forklift. Likewise, it should be understood that the sockets 23, 24 extend the full width of the apparatus 10 so that a forklift can lift the undercarriage 11 and the container 10 by engaging the sockets 23, 24 at either the right or left side walls 13, 14 of the apparatus 10.

Figure 1:
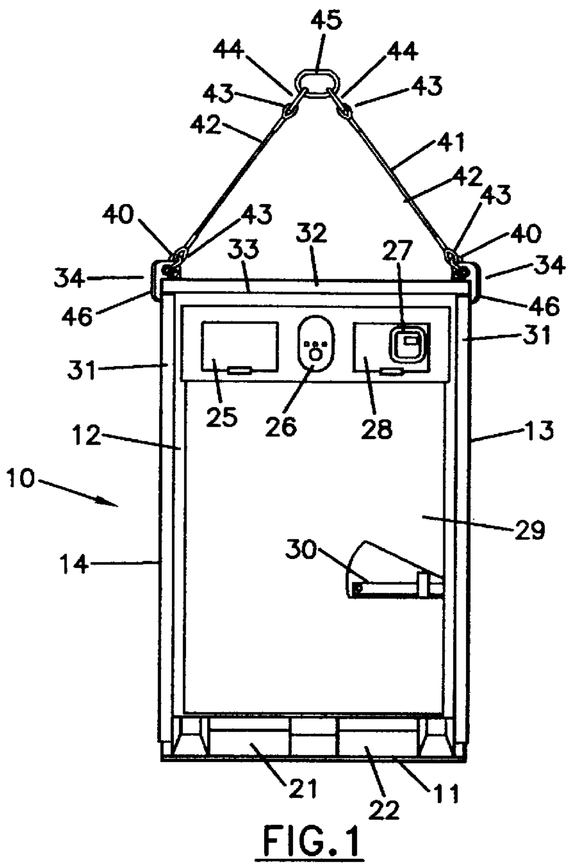
FIG. 1 is a front elevational view of the preferred embodiment of the apparatus of the present invention.
Figure 4:
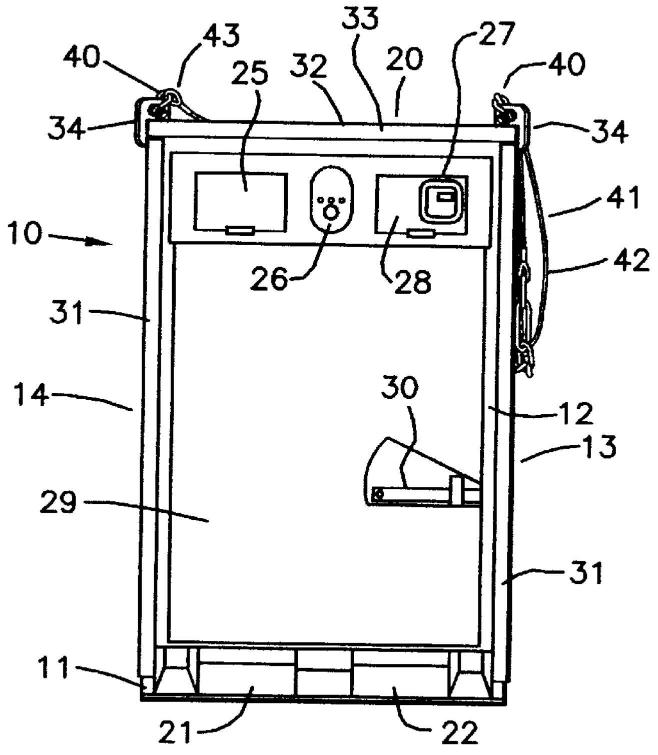
FIG. 4 is a front elevational view of the preferred embodiment of the apparatus of the present invention showing the lifting harness in a collapsed position.
Figure 5:
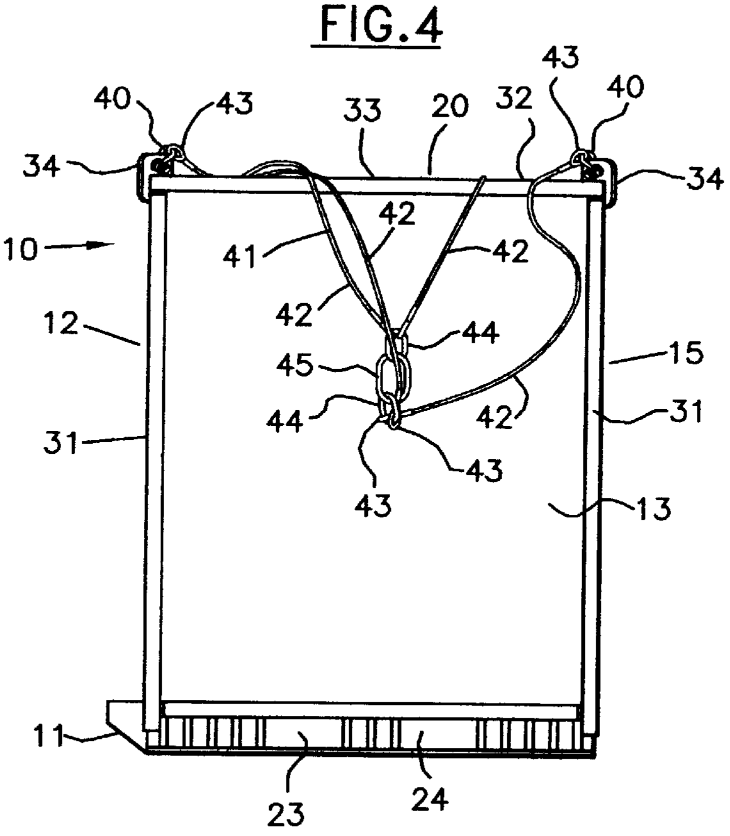
FIG. 5 is a side elevational view of the preferred embodiment of the apparatus of the present invention showing the lifting harness in a collapsed position.

As can be seen in FIGS. 1 and 4, a plurality of panels are provided for operating the refrigerated container 10 including compartment 25 for storing shipping instructions, bills of lading, and the like, as well as other components for operation of the device. In that regard, a gas inlet 26 allows container 10 to be preliminarily cooled with an external gas supply or to used to fill the cylinders containing refrigerant. Control panel 27 of microprocessor base temperature controller can be used to set the temperature within container 10 interior. The microprocessor controller control panel 27 is covered with door 28 for protecting the control panel 27.

The front wall 12 includes a door portion 29 that can be opened and closed. Latch 30 is a closure latch handle that enables a user to open or close the door 29 in order to access the interior of container 10.

In order to protect the corners 16, 17, 18, 19 that are in between the walls 12, 13, 14, 15, a plurality of vertical beam members 31 are provided. Each beam 31 is preferably in the form of an angle member in transverse cross section thus providing a pair of flanges that intersect at 90°, each of the flanges of a beam 31 abutting a side wall 12, 13, 14, or 15. The vertical beams 31 have another function. The vertical beams 31 transfer load in between the structural undercarriage 11 and a top frame 32. The top frame 32 is a rectangular or square frame that is comprised of four horizontal beams 33 connected end-to-end as shown in FIG. 3.

The connection between the ends of horizontal beams 33 can be a mitred, welded connection for example. The beams 33 fit closely against the interface in between a side wall 12, 13, 14, 15 and the top wall 20. Preferably, each of the horizontal beam members 33 is an angle shape in transverse cross section, providing a pair of flanges that intersect at 90° so that one of the flanges of a horizontal beam 33 engages top wall 20 and the other flange of the horizontal beam 33 engages a side wall 12, 13, 14, or 15.

Figure 6:
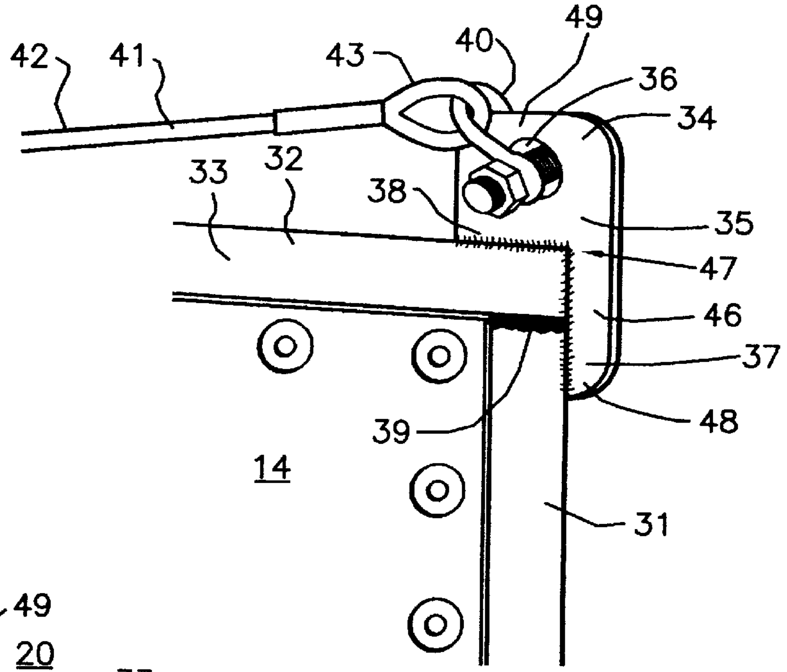
FIG. 6 is a perspective fragmentary view of the preferred embodiment of the apparatus of the present invention illustrating the connection between one of the lifting eyes and the top frame and vertical corner beam portions thereof.
Figure 7:
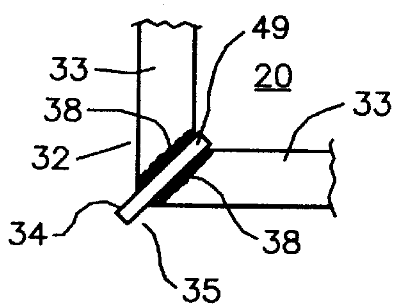
FIG. 7 is a top fragmentary view of the preferred embodiment of the apparatus of the present invention illustrating the connection between the lifting eyes and the top frame.
Figure 8:
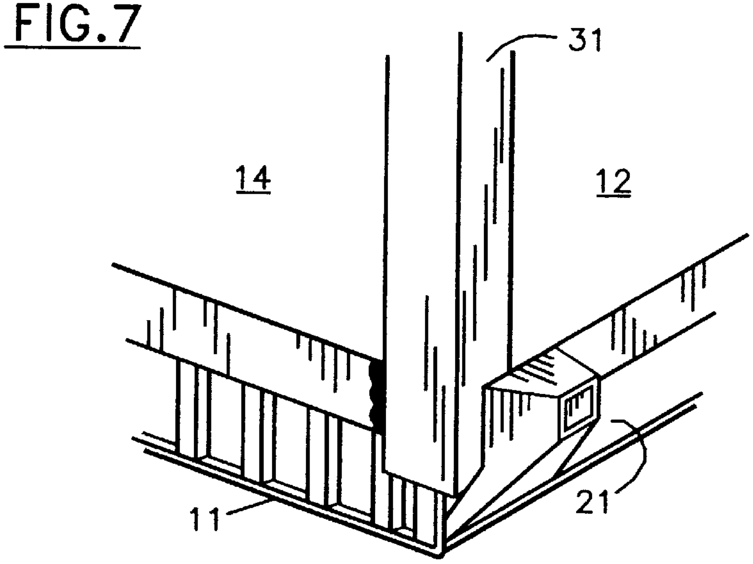
FIG. 8 is a fragmentary perspective view of the preferred embodiment of the apparatus of the present invention illustrating the connection between a vertical corner beam and the undercarriage portion thereof.

A plurality of lifting eyes 34 are position at the corners 16, 17, 18, 19 and at the interface between top frame 32 and each of the vertical corner beam members 31. This connection is perhaps best shown in FIG. 6. The four vertical corner beams 31 are welded or otherwise rigidly connected to top frame 32 at connection 39. This connection 39 is preferably a horizontally weld as shown in FIG. 6. This interface as shown in FIG. 6 between each vertical corner beam 31 and top frame 32 is reinforced by lifting eye 34. The lifting eye 34 is preferably in the form of an elongated vertical plate 35 that is somewhat L-shaped as shown in FIG. 6. The vertical plate 35 has an opening 36 for attaching a lifting harness 41 thereto using shackles 40. Vertical plate 35 has a lower plate section 46 that extends from the top of lifting frame 20 at a position indicated by the arrow 47 in FIG. 6 to a position below connection 39 at lower end 48. A vertical weld 37 extends between the top of the top frame 32 at 47 downwardly to lower end 48 of vertical plate 35. The vertical plate 35 includes an upper plate section 49 that is welded to top frame 32 using horizontal welds 38 as shown in FIGS. 6 and 7.

Figure 2:
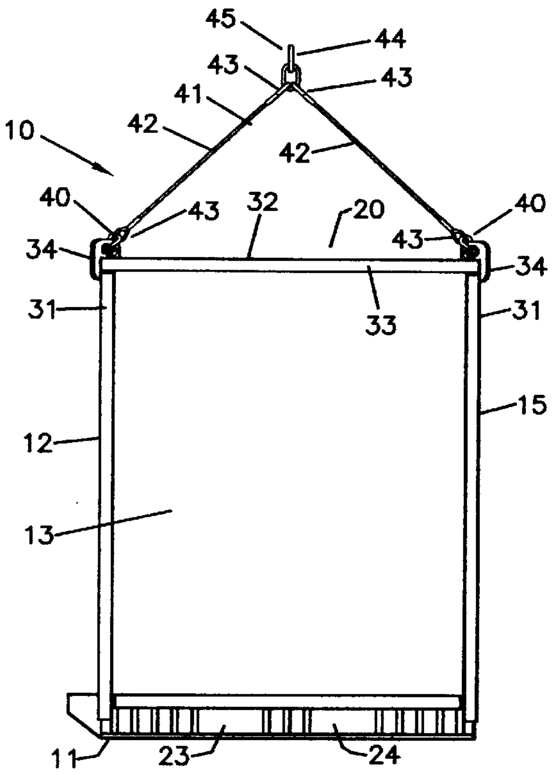
FIG. 2 is a side elevational view of the preferred embodiment of the apparatus of the present invention.

In FIGS. 1–3 and 6, the lifting harness 41 is shown comprised of a plurality of four flexible slings 42, each sling 42 having loop end portions 43. As shown in FIG. 6, the loop end portion 43 of each flexible sling 32 is attached to a lifting eye 34 using shackle 40. Two of the flexible slings 42 are attached to lifting rings 44 as shown in FIGS. 1 and 2. A single lifting ring 45 is attached to the pair of lifting rings 44 as shown in FIGS. 1 and 2.

The following table lists the parts numbers and parts descriptions as used herein and in the drawings attached hereto.

Parts List

| Part Number | Description |
|---|---|
| 10 | refrigerated container |
| 11 | structural undercarriage |
| 12 | front wall |
| 13 | right side wall |
| 14 | left side wall |
| 15 | rear wall |
| 16 | corner |
| 17 | corner |
| 18 | corner |
| 19 | corner |
| 20 | top |
| 21 | fork lift socket |
| 22 | fork lift socket |
| 23 | fork lift socket |
| 24 | fork lift socket |
| 25 | compartment |
| 26 | gas inlet |
| 27 | control panel |
| 28 | access door |
| 29 | front door |
| 30 | closure latch |
| 31 | vertical corner beam |
| 32 | top frame |
| 33 | horizontal beam |
| 34 | lifting eye |
| 35 | vertical plate |
| 36 | opening in plate 35 |
| 37 | vertical weld |
| 38 | horizontal weld |
| 39 | connection |
| 40 | shackle |
| 41 | lifting harness |
| 42 | flexible sling |
| 43 | loop end |
| 44 | lifting ring |
| 45 | lifting ring |
| 46 | lower plate section |
| 47 | position |
| 48 | lower end of plate 35 |
| 49 | upper plate section |

The foregoing embodiments are presented by way of example only; the scope of the present invention is to be limited only by the following claims.

We claim:

1. Apparatus for shipping controlled-temperature cargo in an unrefrigerated cargo area of a substantially larger transport vehicle, vessel, or aircraft, comprising:

a) a container having an interior area with a volume to be loaded with frozen and/or refrigerated and/or other controlled-temperature cargo with an access opening that can be opened and closed, a top, thin side walls that can be easily damaged, and a structural bottom;

b) at least one refrigerant tank mounted in the container for containing a cryogenic liquified refrigerant under pressure to be utilized for cooling the container interior;

c) discharge piping for piping refrigerant from the tanks;

d) a valve communicating with the discharge piping for valving the flow of refrigerant that is discharged from the tank;

e) a temperature responsive controller for opening the valve to dispense liquified refrigerant from the tanks in order to maintain a desired preselected preset refrigerated or frozen temperature range within the container interior;

f) a top frame that includes a plurality of horizontal beams joined end to end positioned at the top of each side wall and a plurality of vertical corner beams extending from the structural base to the horizontal beams, each vertical corner beam defining a tensile load carrying member for transferring load from the horizontal top beams to the structural base; and g) lifting means attached to the container for allowing the container to be picked up by a crane by attaching the crane means to the lifting means, the lifting means including lifting eyes attached to the top of the container at a connected interface between the vertical corner beams and the horizontal top beams, and strap means attached to the lifting eyes.

2. The apparatus of claim 1, wherein the lifting means is attached to the lifting eyes in such a manner as to balance the container when a crane is attached at a single point to the lifting means.

3. The apparatus of claim 1 wherein the structural bottom includes moving means for transporting the container quickly to and from the cargo area of an unrefrigerated vehicle, vessel, or aircraft having a substantially larger volume than the container volume.

4. The apparatus of claim 1, wherein the structural bottom includes a base plate having two spaced apart, parallel slots adapted to be engaged by a forklift lifting device.

5. The apparatus of claim 1, wherein each of the lifting eyes is welded to the top of a vertical beam and to an intersection of two horizontal beams.

6. The apparatus of claim 1, wherein each of the lifting eyes is welded to the top of a vertical beam and to the area next to an intersection of two horizontal beams.

7. The apparatus of claim 1, wherein the horizontal beams include end portions joined to other horizontal beams at a corner that is also a joint between two side walls.

8. Apparatus for shipping controlled-temperature cargo in an unrefrigerated cargo area of a substantially larger transport vehicle, vessel, or aircraft, comprising:

a) a container having a top, side walls, a structural bottom, and an interior area with a volume to be loaded with frozen and/or refrigerated and/or other controlled-temperature cargo with an access opening that can be opened and closed;

b) at least one refrigerant tank mounted in the container for containing a cryogenic liquified refrigerant under pressure to be utilized for cooling the container interior;

c) discharge piping for piping refrigerant from the tanks;

d) a valve communicating with the discharge piping for valving the flow of refrigerant that is discharged from the tank;

e) a temperature responsive controller for opening the valve to dispense liquified refrigerant from the tanks in order to maintain a desired preselected preset refrigerated or frozen temperature range within the container interior; and f) a lifting system attached to the container for allowing the container to be picked up by a crane by attaching the crane to the lifting system, the lifting system including:

(i) a plurality of lifting eyes attached to the top of the container;

(ii) straps attached to the lifting eyes and extending above the top of the container when the container is upright; and (iii) a frame for both transferring load between the lifting eyes and the structural bottom, and protecting the side walls against damage at the joint between adjacent side walls.

9. The apparatus of claim 8, wherein the lifting system is attached to the container in such a manner as to balance the container when the crane is attached at a single point to the lifting system.

10. The apparatus of claim 8, wherein the structural bottom includes forklift recesses for transporting the container quickly to and from the cargo area of an unrefrigerated vehicle, vessel, or aircraft having a substantially larger volume than the container volume.

11. The apparatus of claim 8, wherein the container bottom has two spaced apart, parallel slots adapted to be engaged by a forklift lifting device.

12. The apparatus of claim 8, wherein the straps are joined together at a point above the top of the container to enable the container to be picked up by a crane attached to the lifting system at the point.

13. The apparatus of claim 8, wherein each of the lifting eyes comprises a vertical plate that extends above and below the interface between a vertical beam and a horizontal beam.

14. The apparatus of claim 13, wherein the plate is continuously attached along one of its edges to the combination of a horizontal beam and a vertical beam.

15. A method of shipping refrigerated or frozen perishable goods in an unrefrigerated area of a vessel having a cargo holding area, comprising the steps of:

a) placing the perishable goods into a structural container that can be placed in the cargo holding area of the vessel, the container having a structural undercarriage, side walls that intersect at container corners, a top portion, and lifting eyes positioned at each corner near the top portion;

b) cooling the perishable goods by dispensing a liquid refrigerant from one or more liquid refrigerant containing canisters that are transported within the container;

c) using a valve to dispense liquid refrigerant coolant from the canisters;

d) controlling temperature within the container interior area by a control of the degree of opening of the valve; and e) transferring the container to and from the vessel with a crane means by attaching a crane to a lifting harness which is permanently attached to the container; and f) wherein in step "e" vertical beams both protect the corners and transfer load between the undercarriage and lifting eyes.

16. The method of claim 15, wherein the lifting harness is attached to the container in such a manner as to balance the container when the crane is attached at a single point to the lifting harness.

17. The method of claim 15, further comprising the step of moving the container around the vessel with a forklift that engages the undercarriage at slots of the undercarriage.

18. The method of claim 15, wherein the lifting harness includes:

(i) a top beam portion;

(ii) lifting eyes attached to the top beam portion of the container; and (iii) flexible straps attached to the lifting eyes and extending above the top of the container when the container is upright.

19. The method of claim 18, wherein the lifting harness further comprises a main lifting shackle attached to the flexible straps to enable the container to be lifted by a crane, and wherein the straps are long enough to enable the main lifting shackle to hang over the side of the container when the container is not being lifted by the main lifting shackle.

20. The apparatus of claim 1, wherein the lifting means includes a lifting shackle attached to the lifting means to enable the container to be lifted by a crane, and further comprising strap means long enough to enable the main lifting shackle to hang over the side of the container when the container is not being lifted by the main lifting shackle.

21. The apparatus of claim 8, wherein the lifting system includes flexible straps and further comprising a main lifting shackle attached to the straps to enable the container to be lifted by a crane, and wherein the straps are long enough to enable the main lifting shackle to hang over the side of the container when the container is not being lifted by the main lifting shackle.

22. Apparatus for shipping controlled-temperature cargo in an unrefrigerated cargo area of a substantially larger transport vehicle, vessel, or aircraft, comprising:

a) a container having an interior area with a volume to be loaded with frozen and/or refrigerated and/or other controlled-temperature cargo with an access opening that can be opened and closed, and a plurality of side walls connected at corners;

b) at least one refrigerant tank mounted in the container for containing a cryogenic liquified refrigerant under pressure to be utilized for cooling the container interior;

c) discharge piping means for piping refrigerant from the tanks;

d) valve means communicating with the discharge piping means for valving the flow of refrigerant that is discharged from the tank;

e) temperature responsive controller means for opening the valve means to dispense liquified refrigerant from the tanks in order to maintain a desired preselected preset refrigerated or frozen temperature range within the container interior;

f) a lifting harness attached to the container for allowing the container to be picked up by a crane means by attaching the crane means to the lifting harness, wherein the container has a structural base plate having two spaced apart, parallel slots adapted to be engaged by a forklift lifting device;

g) a reinforced top beam that extends around the perimeter of the container at the top of the container;

h) a plurality of lifting eyes positioned near the top beam portion; and i) a plurality of vertical corner beams that both reinforce the corners and transfer load between the top beam portion and the structural base, wherein the lifting eyes include plate members connected to both the top beam portion and a vertical beam at a corner.

23. Apparatus for shipping controlled-temperature cargo in an unrefrigerated cargo area of a substantially larger transport vehicle, vessel, or aircraft, comprising:

a) a container having an interior area with a volume to be loaded with frozen and/or refrigerated and/or other controlled-temperature cargo with an access opening that can be opened and closed, a plurality of side walls joined at corners, and a top beam portion that extends along an upper edge of each side wall, the frame including a plurality of lifting eyes;

b) at least one refrigerant tank mounted in the container for containing a cryogenic liquified refrigerant under pressure to be utilized for cooling the container interior;

c) discharge piping for piping refrigerant from the tanks;

d) a valve communicating with the discharge piping for valving the flow of refrigerant that is discharged from the tank;

e) a temperature responsive controller for opening the valve to dispense liquified refrigerant from the tanks in order to maintain a desired preselected preset refrigerated or frozen temperature range within the container interior;

f) a lifting system attached to the container for allowing the container to be picked up by a crane by attaching the crane to the lifting system;

g) an undercarriage portion at a lower end of the container that includes forklift recesses for transporting the container quickly to and from the cargo area of an unrefrigerated vehicle, vessel, or aircraft having a substantially larger volume than the container volume; and h) vertical beams for transferring load between the top frame and the undercarriage portion.

* * * * *